United States Patent [19]

Tung et al.

[11] Patent Number: 4,636,900

[45] Date of Patent: Jan. 13, 1987

[54] ARRANGEMENT FOR THE ELIMINATION OF CROSSTALK BETWEEN DATA AND SERVO HEADS

[75] Inventors: Chenshi J. Tung, LaCanada; John Mansueto, Torrance, both of Calif.

[73] Assignee: Xerox Corporation, Stamford, Conn.

[21] Appl. No.: 537,622

[22] Filed: Sep. 30, 1983

[51] Int. Cl.$^4$ ............................................. G11B 5/17
[52] U.S. Cl. ..................................... 360/124; 360/103
[58] Field of Search ................ 360/124, 128, 129, 98, 360/103

[56] References Cited

U.S. PATENT DOCUMENTS 3,975,771  8/1976  Lazzari ........................... 360/124 X
4,402,025  8/1983  Anderson ............................ 360/98

OTHER PUBLICATIONS

IBM TDB; vol. 18, #7, Dec. 1975, pp. 2258–2259; Castrodale et al, "Shield for Protect'g Mag. Head . . . ".

Primary Examiner—A. J. Heinz
Attorney, Agent, or Firm—Robert E. Cunha

[57] ABSTRACT

An arm assembly for a disk drive having a read/write head and a servo head on the same Winchester arm assembly is described. To eliminate the possibility of crosstalk from the data head during the write mode, to the servo head, a mumetal shield is used to partially surround the servo head ferrite core and coil. The servo head is a composite structure having a non-conducting body and a thin ferrite core so that the magnetic core volume to be shielded is minimized. In addition, a conducting layer and a ferramic plate is interposed between the data and servo heads to further isolate these heads.

4 Claims, 5 Drawing Figures

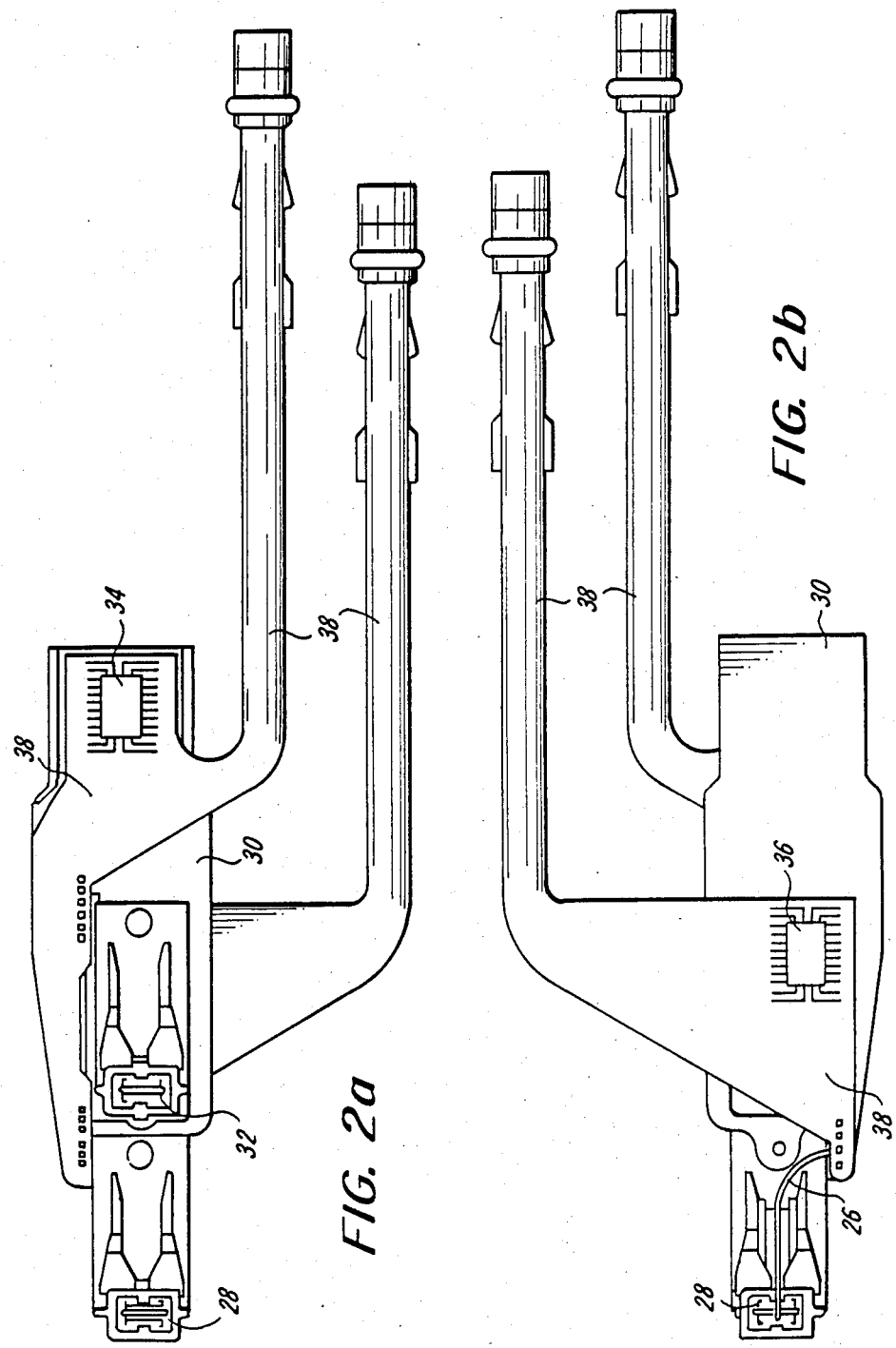

ARRANGEMENT FOR THE ELIMINATION OF CROSSTALK BETWEEN DATA AND SERVO HEADS

This invention relates to a Winchester servo arm assembly which contains a monolithic data head and a shielded composite servo head and is particularly applicable to moving head disk memories with track following servos in the area of magnetic peripherals of data processing systems.

It is known that magnetic disks carry digital data on concentric circular recording tracks, with radial width of the order of mils. Digital information is written to, or read back from, a magnetic disk using a magnetic transducer (recording head) that flies on the disk surface with a flying height of the order of tens of micro-inches. Several parallel and coaxially mounted magnetic disks with precision spacers between them are driven in rotation at a constant speed by an electric motor. One of the disk surfaces has pre-recorded servo information. The servo-recording head accesses this information continuously to provide track following, indexing and clock signals. The data-recording read/write heads and servo head are rigidly mounted to a head-positioning carriage as facing pairs, and are spaced and aligned to approach the upper and lower surfaces of the magnetic disks.

In order to increase recording density, decrease the track accessing time, or the head traveling distance, two data heads are used for each recording surface. On the disk surface containing the servo information, it is desirable to have a data head on the same arm hardware of the servo head, so that the remaining half of the disk surface can be used for data storage. However, the writing head emits high frequency electromagnetic waves that are picked up at the coil of the servo head. A noise voltage is induced at the servo coil. This noise causes a degradation of the servo signal to the point where the position, index, clock and threshold signal noise is not tolerable. Conventional design uses only a servo head on the servo surface, and leaves half of the servo disk surface unused.

The present invention is characterized by assembling a monolithic data head and a composite servo head with mumetal shielding over the ferrite and around the coil, on the same Winchester hear arm. The lead wires from the coil to the flat flex cable are twisted to reduce pickup from the external field. The flex cable contains electrical leads and an IC read/write amplifier. On the bottom of the servo flex cable is a layered common return-conducting plane. A piece of attenuator-rated ferramic plate is glued to the common return-conducting plane of the servo flex cable to reduce the intensity of the emitted electromagnetic waves around the servo head. In accordance with the present invention, the servo and data heads are assembled on a common Winchester arm with the appropriate shielding and noise reduction arrangements. This additional data head gives more storage capability to a disk drive.

To understand the principles of operation and construction of the assembly according to the invention, it may be useful to review a few facts of crosstalk interference and electromagnetic shielding. The crosstalk interference occurs when the data head is writing information onto the disk. The data signal couples into the servo signal through electromagnetic radiation. There is virtually no coupling of servo signal into the read data head. The coupling between the servo head and the other data heads (those data heads not on the same recording surface of the servo head) are negligibly small because they are separated by recording disks which act as good electromagnetic shields for the servo head (the servo-data arm is located at the bottom recording surface of the spindle). Thus, the main crosstalk noise comes from the writing data head located at the servo-data arm.

The distance between the servo head and the data head in the described embodiment is 1.394 inch. Within this range, there are three types of interactions that are the sources of crosstalk noise.

First, the ferrite pole pieces of the servo head receive and concentrate the magnetic flux emitted from the gap zone of the data head during the writing operation. A spurious noise voltage is induced at the servo coil from those changing magnetic fluxes. To decouple this interaction, an electromagnetic shield has to be used. There is no way to shield the emitting source (gap zone of the data head) without effecting the proper operation of the data head. Shielding the servo head is necessary.

Second, the coupling (mutual inductance) between the electrical leads for the servo head and the data head will generate intolerable noise if they are not properly arranged. This interaction varies linearly with the writing current.

Third, a change of current in the data coil will produce a noise voltage at the servo coil. This noise voltage is related to the mutual inductance of those two coils. This interaction is small compared with interactions 1 and 2.

Based on the noise-causing interactions described above, the following innovative designs have been implemented.

The conventional monolithic type slider which was chosen for the read/write head is made from a chunk of ferrite which concentrates the electromagnetic flux emitted from the data head. It is very hard to shield the whole slider without damaging the flying characteristics of the slider. The composite slider was chosen for the servo head because its ferrite portion is just a thin slab (thickness=core tracks width) which can be shielded easily with mumetal. The mumetal covers both the ferrite and the coil, leaving only the bottom portion of the ferrite (containing the core gap) unshielded.

The electrical leads for the data signal and the servo signal are located away from each other as far as possible. Separate flex cables and preamplifiers are used. The electrical leads from the recording coil to the flex cable are twisted to reduce electromagnetic noise pick-up.

On the bottom portion of the servo flex cable (located above the data head) is a layer of conducting material. A piece of attenuator-rated ferramic plate (located between the flex cable and the data head) is glued to the servo flex cable. Both the conducting layer and the ferramic plate are used to shield the electromagnetic wave emitted by the data head. This conducting layer also reduces the radio frequency noise pick-up for the servo preamplifier.

With these arrangements, the crosstalk noise is reduced to a tolerable amount. These arrangements make it possible for the servo and data head to be assembled on a common Winchester arm, and give more storage capacity to the disk drives.

The details of this invention can be more clearly understood with reference to the following drawings.

FIG. 2a is a bottom view of the arm assembly.

FIG. 2b is a top view of the arm assembly.

Figure 1A:
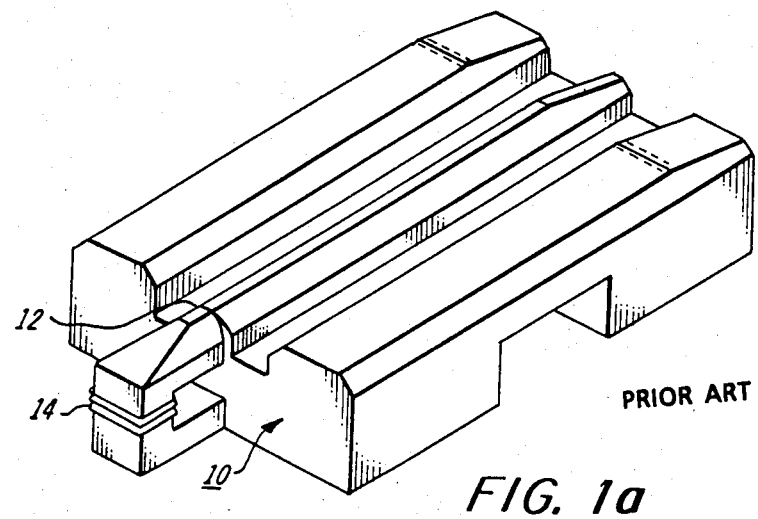
FIG. 1a is the bottom view of a monolithic slider.

The data head of FIG. 1a comprises a monolithic type slider, the flyer body 10 being made from MnZn ferrite. The read/write element core gap 12 creates a local magnetic read/write field in association with the read/write coil 14. In this described embodiment, the dimension of the slides are 0.220" long, 0.155" wide and 0.076" thick.

The amount of signal picked up at the gap 12 and sensed by the coil 14 is at a very low amplitude and therefore does not constitute a source of interference with regard to the servo head. Similarly, signals sensed at the servo head do not interfere with the data head. However, the signal used to drive the coil 14 during the writing of data onto the disk is relatively large, and it is this write current which generates high frequency electromagnetic waves which are picked up by the coil of the servo head, causing interference.

Figure 1B:
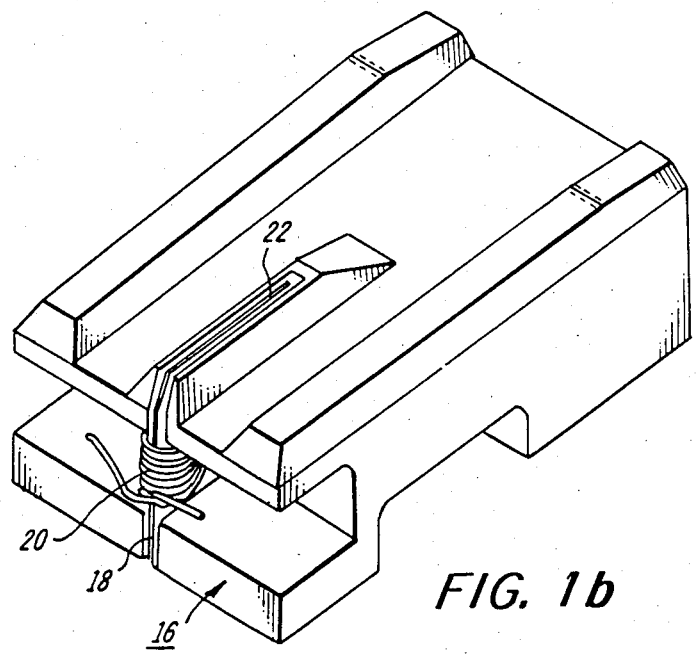
FIG. 1b is a bottom view of a composite slider.
Figure 1C:
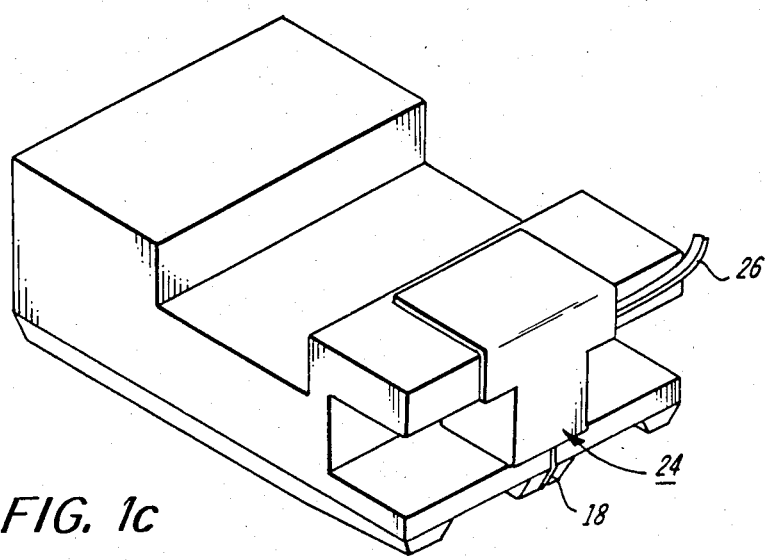
FIG. 1c is a top view of a composite slider with a shield.

To eliminate this interference, a composite type slider is used for the servo head, as shown in FIGS. 1b and 1c.

The non-magnetic flyer body 16 is calcium titanate into which is inserted a thin slab of MnZn ferrite to produce a magnetic ferrite core 18. Around this core 18 is wrapped the read/write coil 20, and the core has a gap 22 to create a read/write element. The dimensions of this slider in this described embodiment are 0.235" long, 0.155" wide and 0.076" thick.

The top view, FIG. 1c, of this composite slider shows a mumetal shield 24 covering the ferrite core 18, the coil 20 and the connections between the electrical heads 26 and the read/write coil 20. The mumetal effectively surrounds the coil in four directions, as shown, to minimize radiated electromagnetic radiation.

These heads are mounted on a servo arm as shown in FIGS. 2a and 2b. The servo head is located at the top of the drawing at the end of the arm 30, and the data head 32 is located below it, the spacing being such that each head can read one half of the disk surface. In the bottom view, FIG. 2a, the shield 24, not shown, will cover the top of the data head 32 to attenuate the electromagnetic waves transmitted toward the servo head 28. A preamplifier 34 for the data signal and another preamplifier 36 for the servo head are also located on the arm 30. Cables 38 carry the preamplified signal to the disk drive electronics. To further minimize crosstalk, the leads 26 to the servo head are twisted.

The bottom surface of the servo cable 38, which is located between the data head 32 and the servo preamplifier 36, comprises a layer of conducting material and a ferramic plate to provide a further barrier between the data head 32 and servo head 28.

The advantage of this system is that in a disk drive which has two heads for each disk surface, one surface can be shared between a servo and a data head without degradation of the servo signals.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

We claim:

1. A disk drive comprising a disk having an upper and lower surface on which is recorded servo information and data on the upper surface, and an arm assembly located above said disk, said arm assembly comprising:
   a read/write data head for reading data from and writing data onto a data portion of said disk,
   a composite servo head positioned on said arm to read servo information from a servo portion of the disk surface comprising a slider body with a ferrite core mounted on said body, said ferrite core having a bottom facing the upper surface of said disk, said core having a coil mounting portion for supporting, a coil wound on said core, a two-dimensional mumetal sheet which is cut and bent to form an envelope which surrounds only the top, two sides, and trailing end of the coil and portions of said ferrite core to shield said core and coil to minimize noise picked up by said servo coil from the data head, and
   a mumetal plate shield between said data head and electrical cable which passes over said data head to connect said servo head with said disk drive.

2. The arm assembly of claim 1 wherein said servo head comprises a body made of calcium titanate and a core of MnZn ferrite.

3. The assembly of claim 2 further comprising a preamplifier for each head located on the arm assembly to minimize the length of cable attached directly to said servo head.

4. The assembly of claim 3 wherein the servo head is located at an end of the arm, said data head is located at a distance from the end of the arm, and the cable of the servo head which passes over the data head is shielded by said shield.

* * * * *